Figure 5:
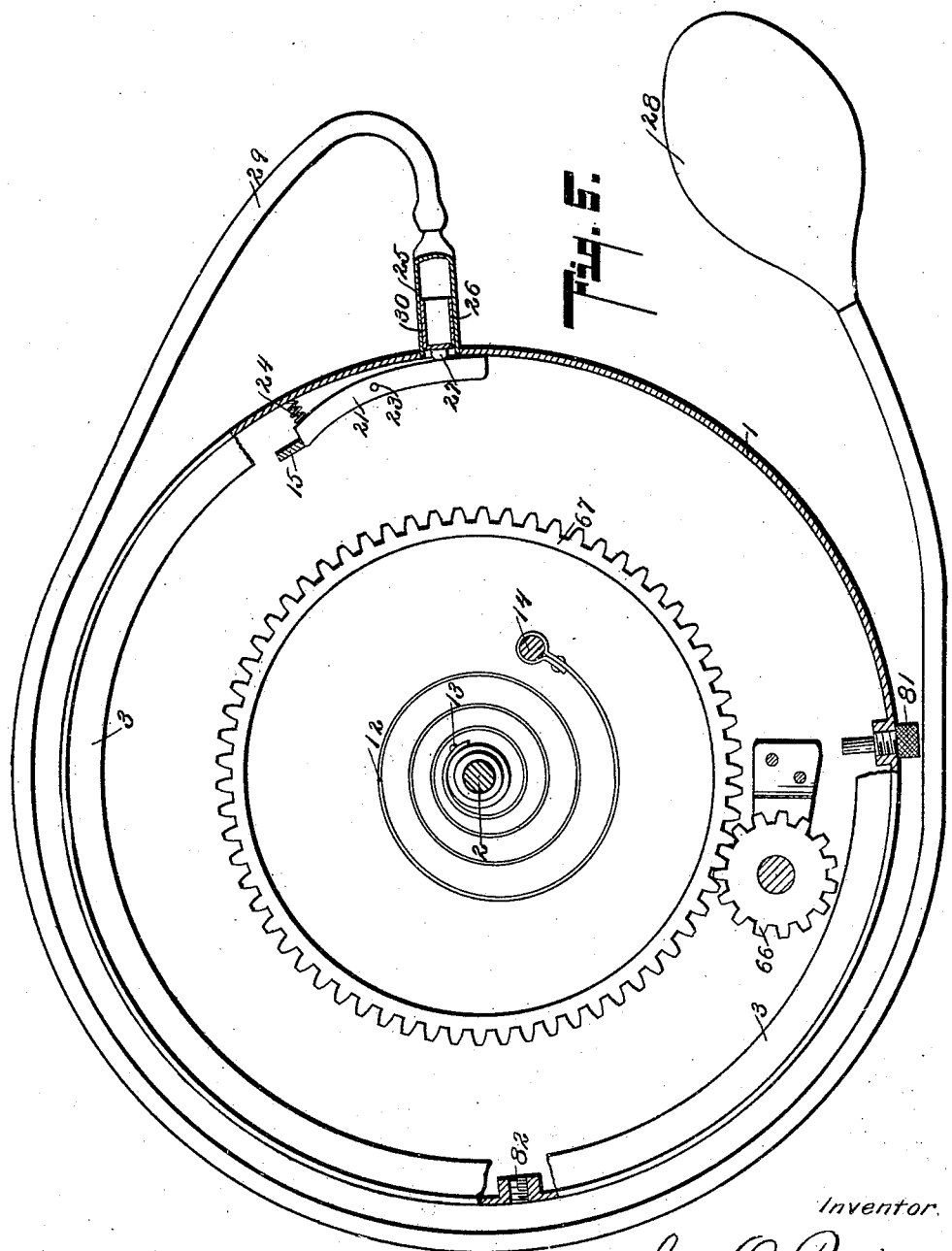

I. O. PERRING.
CAMERA.
APPLICATION FILED JAN. 11, 1909.
941,688.
Patented Nov. 30, 1909.
5 SHEETS—SHEET 1.
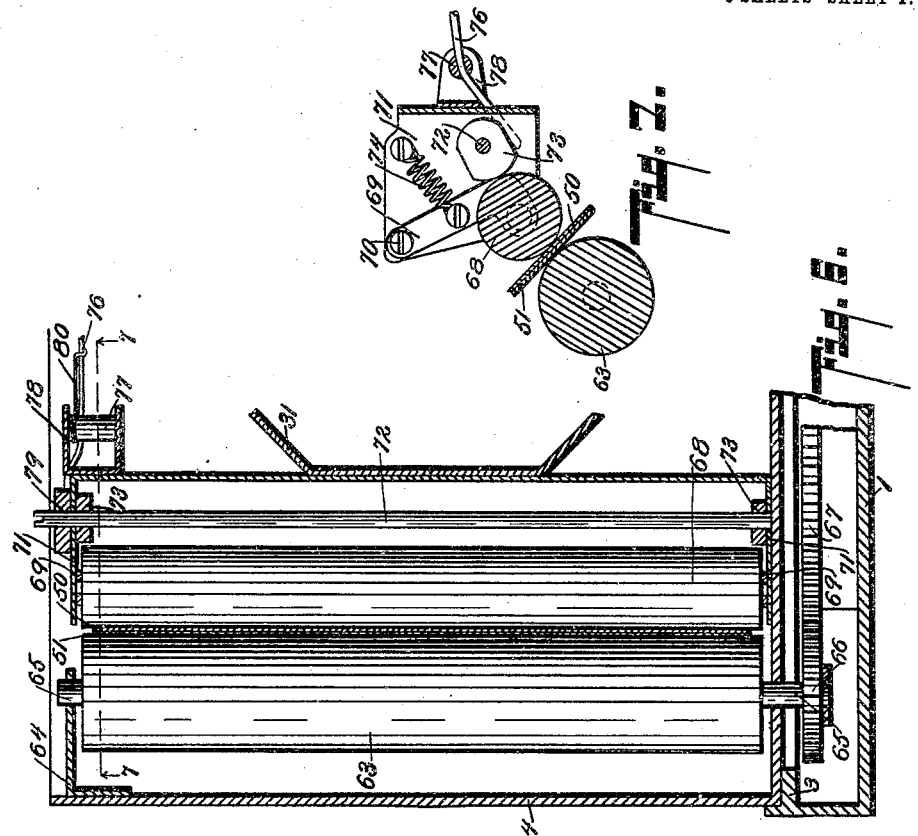
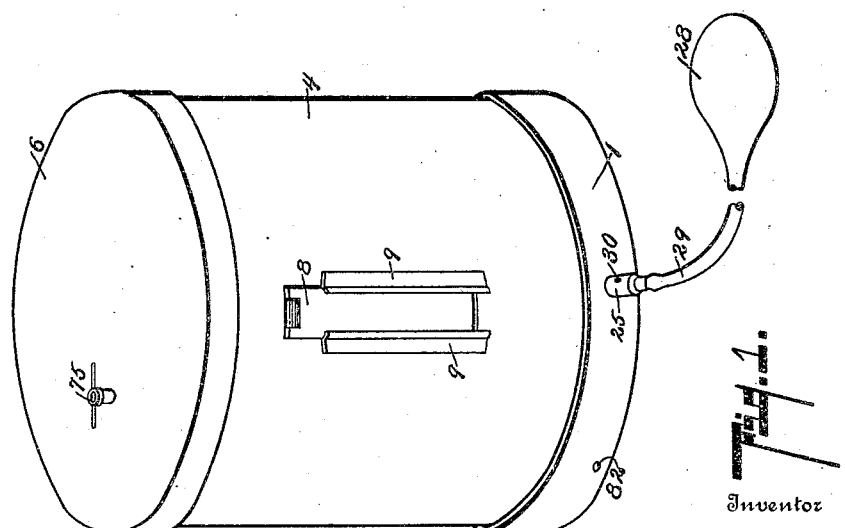
Witnesses
F. G. Tallman.
M. P. Woodruff.
Inventor
Ira O. Perring
By Chappell & Earl
Attorneys

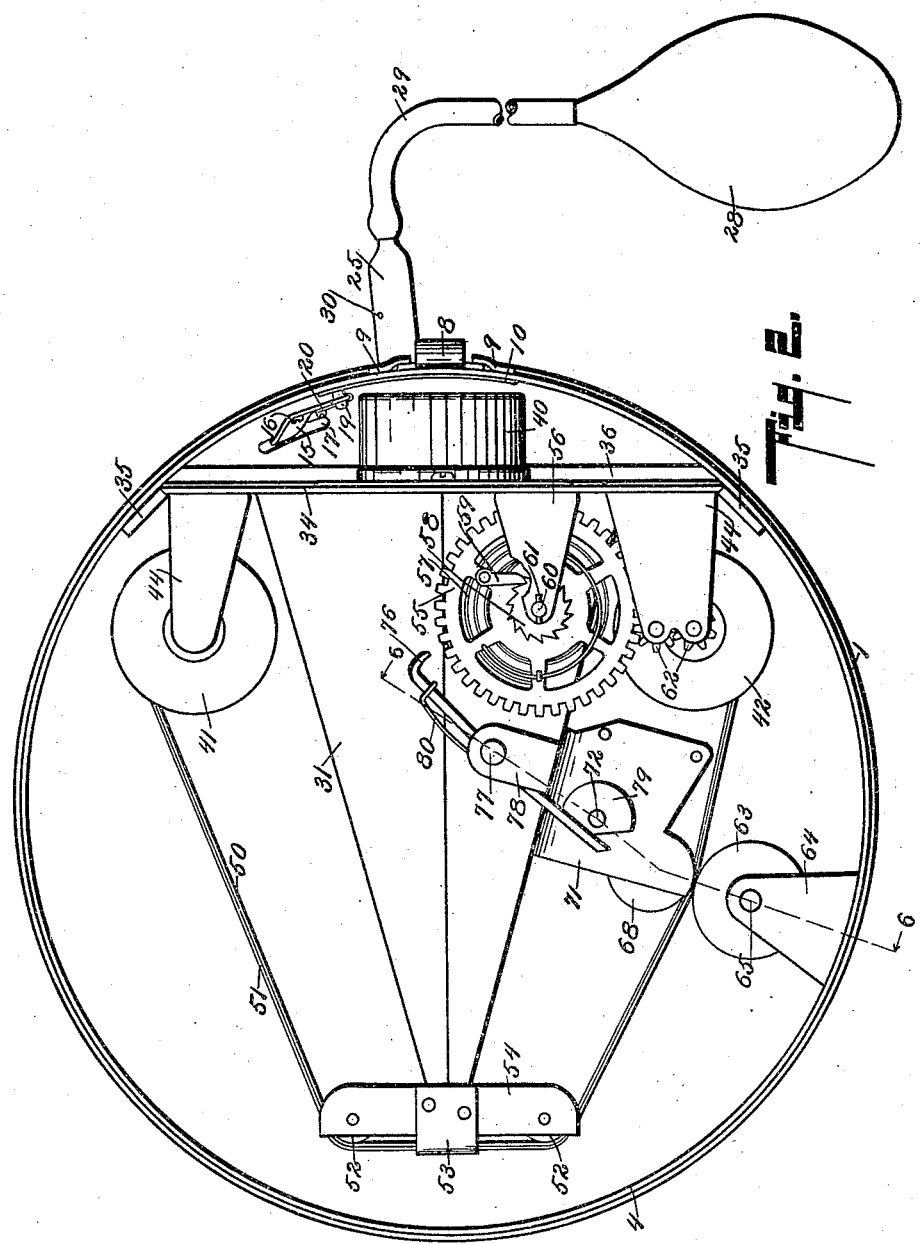

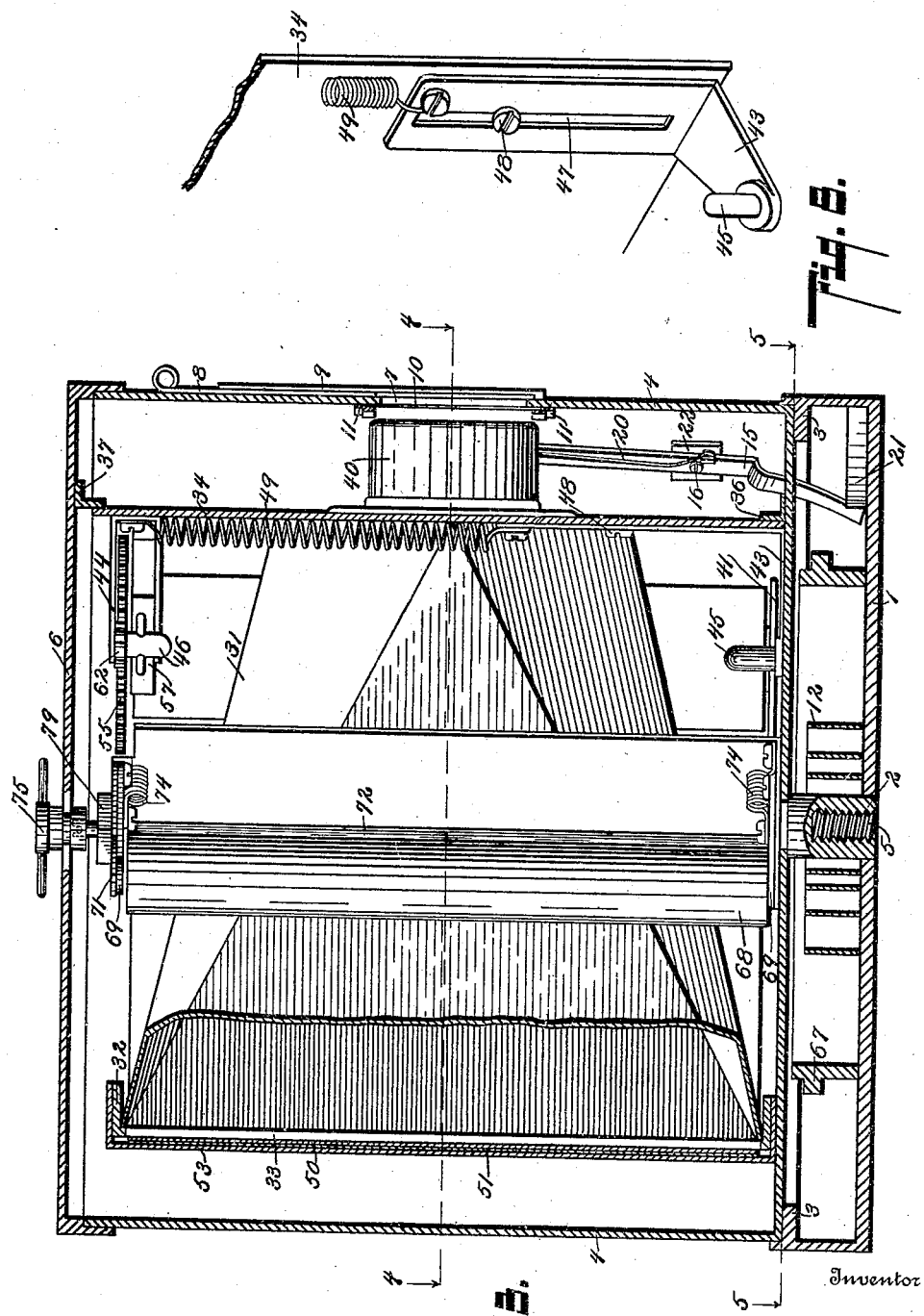

I. O. PERRING.
CAMERA.
APPLICATION FILED JAN. 11, 1909.
941,688.
Patented Nov. 30, 1909.
5 SHEETS—SHEET 4.
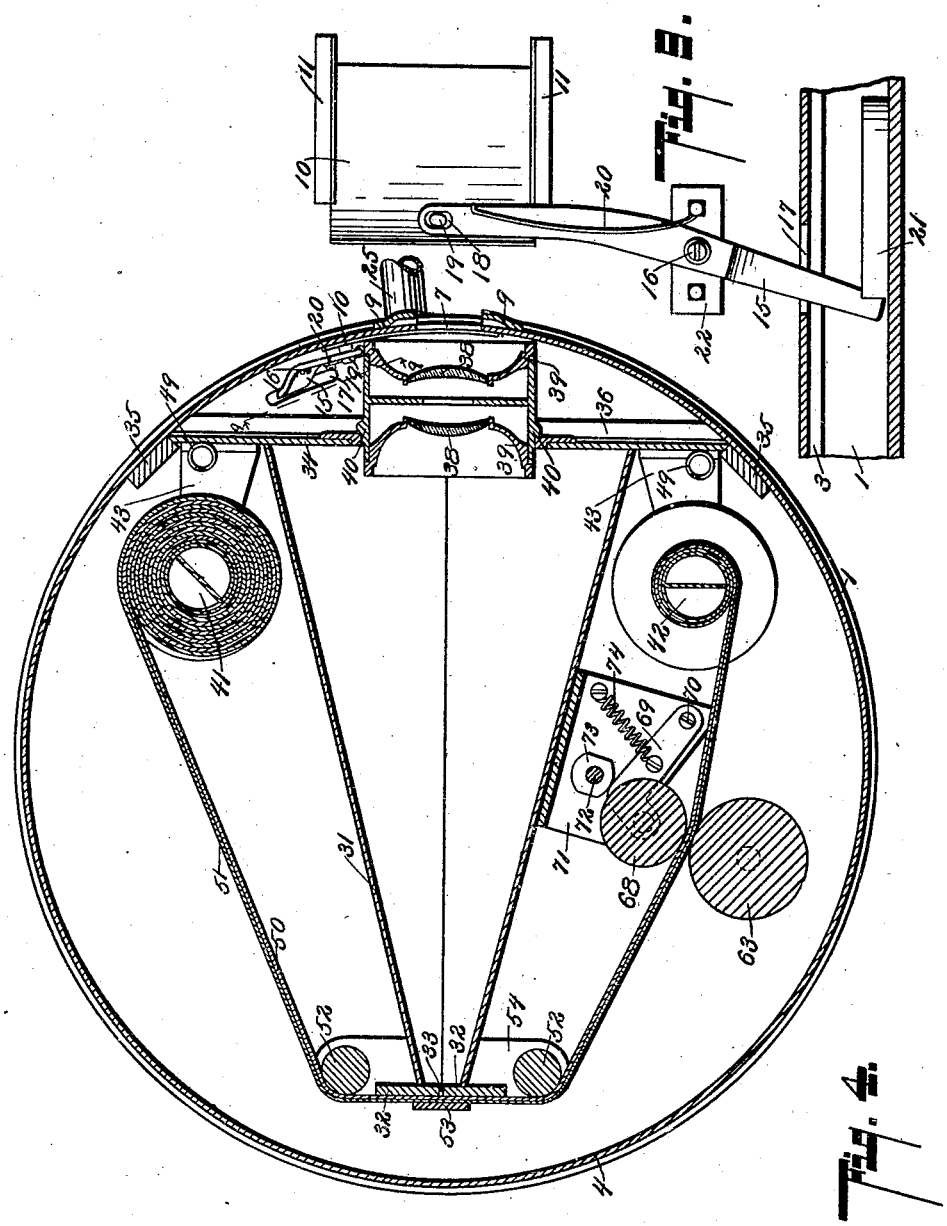
Witnesses
F. G. Tallman
M. P. Woodruff
Inventor
Ira O. Perring
By Chappell & Earl
Attorneys

I. O. PERRING.
CAMERA.
APPLICATION FILED JAN. 11, 1909.

941,688.

Patented Nov. 30, 1909.
5 SHEETS—SHEET 5.

Witnesses
F. G. Tallman.
M. O. Woodruff.

Inventor.
Ira O. Perring
By Chappell & Earl
Attorneys

UNITED STATES PATENT OFFICE.

IRA O. PERRING, OF KALAMAZOO, MICHIGAN.

CAMERA.

941,688.  Specification of Letters Patent.  Patented Nov. 30, 1909.

Application filed January 11, 1909. Serial No. 471,644.

*To all whom it may concern:*

Be it known that I, IRA O. PERRING, a citizen of the United States, residing in the city and county of Kalamazoo, State of Michigan, have invented certain new and useful Improvements in Cameras, of which the following is a specification.

This invention relates to improvements in panoramic cameras.

The main objects of this invention are: First, to provide an improved panoramic camera which is very simple in its operation, and, at the same time, produces very satisfactory results. Second, to provide an improved panoramic camera in which the shutter is automatically opened and closed. Third, to provide in a panoramic camera an improved means for shifting the films. Fourth, to provide an improved panoramic camera which is comparatively simple and economical in structure and one which is not likely to get out of repair in use.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a perspective view of a structure embodying the features of my invention. Fig. 2 is a plan view with the cover of the casing removed. Fig. 3 is a detail side elevation with the base, casing, and portion of the lens box shown in vertical section, the film receiving roller being removed. Fig. 4 is a horizontal section, taken on a line corresponding to line 4—4 of Fig. 3. Fig. 5 is a horizontal section, taken on a line corresponding to line 5—5 of Fig. 3. Fig. 6 is a detail vertical section, taken on a line corresponding to the broken line 6—6 of Fig. 2, showing the arrangement of the feed rollers. Fig. 7 is a detail cross section, taken on a line corresponding to line 7—7 of Fig. 6. Fig. 8 is an enlarged detail showing one of the supports for one end of the film rollers. Fig. 9 is an enlarged detail showing the shutter and the actuating means therefor.

In the drawing, the sectional views are taken looking in the direction of the little arrows at the ends of the section lines, and similar numerals of reference refer to similar parts throughout the several views.

Referring to the drawing, the base 1 is provided with a central post 2 and with a peripheral way 3, on which the casing 4 is mounted to revolve. The post 2 is preferably provided with a threaded hole 5, adapted to receive the screw of a tripod.

The casing 4 is preferably cylindrical and formed of metal and provided with a removable cover 6, having a downwardly-projecting flange adapted to receive the upper end of the casing. The casing is provided in one side with a shutter opening 7. This opening is preferably provided with a slide closure or door 8, arranged in the vertical slides 9,—see Figs. 1 and 3.

The shutter 10 is preferably arranged in the horizontally-arranged guides 11, so as to move horizontally in opening and closing. The casing 4 is driven or revolved by a spring 12, one end of which is secured, as at 13, to the base post 2, and the other end by means of the pin 14 to the bottom of the casing.

By turning the casing in one direction, the spring is wound, and, when released, it will revolve the casing in the opposite direction. The casing is held in its set position by means of the lever 15, which is pivoted at 16 on the plate 22 secured to the inside of the casing, its lower end being arranged through a slot 17 so that it projects into the base, its upper end being connected to the shutter 10.

The connection for the lever 15 to the shutter preferably consists of the slot 17 in the upper end of the lever which engages a pin 19 on the shutter. A spring 20 is provided for opening the shutter when the lever 15 is released from the stop 21. The spring 20 is secured at one end to the plate 22 on which the lever is pivoted and its free end arranged to engage the upper end of the lever, as clearly appears in Fig. 9.

The trip stop 21 is pivoted at 23 on the bottom of the base and is held normally in position to engage the lever by means of the coiled spring 24. When the lever engages this stop, the casing is not only held, but the shutter is closed, owing to the spring 12 being of greater strength than the spring 20.

As soon, however, as the lever is released by the tripping of the stop, the spring 20 will open the shutter.

I preferably actuate the trip 21 by means of an engine consisting of a cylinder 25 having a plunger 26 therein, the plunger being provided with a pin 27 on its inner end adapted to engage the pivoted stop. The plunger is pneumatically actuated by any suitable means, as by the hand bulb 28, as is common practice, the bulb being connected by means of the tube 29 to the outer end of the cylinder. The cylinder is preferably provided with an exhaust port 30, which allows the escape of air when the plunger reaches the inner end of its stroke, thereby allowing it to return to permit the stop 21 to swing into its engaging position without the necessity of manipulating the bulb 28 to return it. This feature is desirable on account of the rapidity with which the casing revolves, which would render it difficult to manually manipulate the engine to return the stop to its engaging position.

The lens box 31 is preferably made up of triangularly-shaped side walls, thereby forming a body hexagonal in cross section and expanded vertically and tapered horizontally toward the rear, as clearly appears from the drawing.

The rear wall 32 is provided with a narrow vertical slit-like opening 33. The front wall 34 is preferably arranged to project at each side of the side walls, as is illustrated, to provide means for supporting the lens box in position, and also for the attachment of the film supporting and winding mechanism. The casing 4 is preferably provided with a pair of vertical strips 35, secured on its inner wall and coacting with the wall of the casing to form vertical grooves adapted to receive the ends of the front wall of the lens box—see Fig. 4. The bottom of the casing is preferably provided with an upwardly-projecting flange 36 against which the lower end of the wall 34 rests when the lens box is in the casing, and the casing cover is preferably provided with a flange-like strip 37 adapted to engage the upper end of the casing when it is in position.

The lenses 38 are supported by suitable holders 39 in the lens tube 40, which is mounted on the front wall of lens plate 34 in the lens box. I illustrate herein a double lens formed and arranged to secure the so-called universal focus, as I am enabled to secure the best general results with such lenses. It is obvious, however, that any form or arrangement of lenses desired might be used.

The film delivery roller 41 is arranged in one side of the box and the film receiving roller 42 of the lens box is arranged on the other side,—see Fig. 4. These rollers are supported by brackets 43 and 44, the brackets 43 having upwardly-projecting bearing pins or studs 45 thereon, while the brackets 44 have downwardly-projecting bearing pins or studs 46. These brackets are provided with slots 47 so that they may be slidably secured to the wall by means of the screw 48 engaging the slots. Coiled springs 49 are provided for yieldingly holding the journals in the rollers.

The film 50 is preferably provided with its usual protecting strip 51. The film is passed from the delivery roll rearwardly over the guide rollers 52, which are arranged to deliver the film across the opening 33 of the lens box, the film being passed under the retaining plate 53 which holds it against the rear wall of the lens box,—see Fig. 4.

The guide rollers 52 are journaled in the cross pieces 54, mounted on the rear end of the lens box. The film receiving roller 42 is driven to wind up the film by means of the gear 55, which is mounted on a bracket 56, projecting from the front wall 34 of the lens box. This gear 55 is driven by the spring 57, a suitable ratchet 58 and dog 59 being provided for connecting the wheel to the winding spindle 60, which I preferably provide with a suitable cross pin 61 to receive the winding key. The gear 55 is connected by the pinions 62 to the driving bearing stud of the film receiving roller, so that the same is driven to wind up the film.

The film is fed by means of the feed roller 63, which is journaled in suitable brackets 64 mounted on the casing. On the lower end of the shaft 65 of the feed roller is a gear 66 which is arranged to mesh with the gear 67 secured to the base, so that, as the casing is revolved, the gear 66, traveling around the fixed gear 67, drives the feed roller and times the feeding of the film with the movement of the casing. This connection is clearly illustrated in Fig. 6. The pressure roller 68 is arranged to coact with the feed roller 63 in feeding the film,—that is, it holds the film against the feed roller with the desired friction so that it is fed thereby. This pressure roller 68 is adjustably mounted so that it may be thrown into and out of its operative position. This I preferably accomplish by mounting its bearings on the swinging arms 69, which are pivoted at 70 on the bracket 71, which is secured to the side of the lens box, as clearly appears in Figs. 6 and 7. The arms 69 are swung to bring the roller into its operative position by means of the rock shaft 72, which is provided with cams 73 which are adapted to engage the arms and swing them to the position illustrated in Figs. 6 and 7. When the rock shaft is turned to release the pressure roller, it is swung out of its operative position by means of the spring 74. The rock shaft 72 is preferably operated by means of a key 75 adapted to be inserted through the cover of the casing. This rock shaft is also preferably arranged to control the locking dog 76 for the gear 55, the locking dog being pivoted at 77 on the bracket 78, so that its end is engaged by the cam 79 on the rock shaft. The dog 76 is thrown out of its engaging position by means of the spring 80. By thus arranging and connecting the parts, when the pressure roller is thrown into its operative position, the winding means for the receiving film roller is released so that, when the camera is actuated to release the trip dog 21, the film is automatically fed and wound up, as the casing revolves.

To regulate the length or extent of the view, I provide an adjustable stop 81, which may be inserted into the holes 82 provided therefor in the base to engage the lever 15, thereby stopping the casing and closing the shutter, the same as though the casing had made its complete revolution and the lever engaged the trip stop 21. It is obvious that these adjustable trip stops 81 may be located as desired.

I have, in my structure illustrated, provided three of the trip stops so that views may be taken covering an arc of ninety, one hundred eighty, and two hundred seventy, or a complete circle, as desired.

My improved camera is very quickly and easily operated and produces very satisfactory results. The casing revolves on a central pivot, so that the relative position of the lens and the film is maintained throughout the complete operation of the camera.

By providing the narrow opening 33 a clear, distinct negative is secured.

I have illustrated and described my improved camera in detail in the form preferred by me on account of the convenience in its operation and also in the manufacture and assembling of the parts. I am aware, however, that it is capable of very considerable variation in structural details without departing from my invention, and I desire to be understood as claiming the same specifically as well as broadly.

Having thus described my invention, what I claim as new and desire to secure by Letters Patent is:

1. The combination with a base; a casing having a shutter opening therein revolubly mounted on said base; a driving spring for said casing connected thereto and to said base; a shutter; a shutter opening spring; a shutter actuating lever pivoted on said casing; a stop for said lever arranged on said base whereby said lever is adapted to hold said casing in its set position and to close said shutter against the tension of its said opening spring; means for tripping said stop; a lens box; delivery and receiving film rollers; driving means for the receiving film roller; a feed roller mounted on said casing; a pressure roller adapted to coact with said feed roller; a gear carried by said base; a gear connecting said feed roller with said gear on said base; adjustable bearings for said pressure roller; means for shifting said bearings; and a locking dog for said receiving film roller driving means arranged to be actuated by said pressure roller shifting means.

2. The combination with a base; a casing having a shutter opening therein revolubly mounted on said base; a driving spring for said casing connected thereto and to said base; a shutter; a shutter opening spring; a shutter actuating lever pivoted on said casing; a stop for said lever arranged on said base whereby said lever is adapted to hold said casing in its set position and to close said shutter against the tension of its said opening spring; means for tripping said stop; a lens box; delivery and receiving film rollers; driving means for the receiving film roller; a feed roller mounted on said casing; a pressure roller adapted to coact with said feed roller; a gear carried by said base; and a gear connecting said feed roller with said gear on said base.

3. The combination with a base, of a casing having a shutter opening therein revolubly mounted on said base; a driving spring for said casing connected thereto and to said base; a shutter; a shutter opening spring; a shutter actuating lever pivoted on said casing; a stop for said lever arranged on said base whereby said lever is adapted to hold said casing in its set position and to close said shutter against the tension of its said opening spring; means for tripping said stop; a lens box; delivery and receiving film rollers; and driving means for the receiving film roller.

4. The combination with a base, of a casing having a shutter opening therein revolubly mounted in said base; a driving spring for said casing connected thereto and to said base; a shutter; a shutter opening spring; a shutter actuating lever pivoted on said casing; a stop for said lever arranged on said base whereby said lever is adapted to hold said casing in its set position and to close said shutter against the tension of its said opening spring; and means for tripping said stop.

5. The combination with a base having a central bearing post and a peripheral way; a casing having a shutter opening therein mounted to revolve on said post and way; a driving spring for said casing connected thereto and to said base; a shutter; a shutter opening spring; a shutter actuating lever pivoted on said casing; a stop for said lever arranged on said base whereby said lever is adapted to hold said casing in its set position and to close said shutter against the tension of its said opening spring; means for tripping said stop; a lens box; delivery and receiving film roller; driving means for the receiving film roller; a feed roller mounted on said casing; a pressure roller adapted to coact with said feed roller; a gear carried by said base; a gear connecting said feed roller with said gear on said base; adjustable bearings for said pressure roller; means for shifting said bearings; and a locking dog for said receiving film roller driving means arranged to be actuated by said pressure roller shifting means.

6. The combination with a base having a central bearing post and a peripheral way; a casing mounted to revolve on said post and way; a driving spring for said casing connected thereto and to said base; a lens box; delivery and receiving film rollers; driving means for the receiving film roller; a feed roller mounted on said casing; a pressure roller adapted to coact with said feed roller; a gear carried by said base; a gear connecting said feed roller with said gear on said base; adjustable bearings for said pressure roller; means for shifting said bearings; and a locking dog for said film roller driving means arranged to be actuated by said pressure roller shifting means.

7. The combination with a base having a central bearing post and a peripheral way; a casing mounted to revolve on said post and way; a driving spring for said casing connected thereto and to said base; a lens box; delivery and receiving film rollers; driving means for the receiving film roller; a feed roller mounted on said casing; a pressure roller adapted to coact with said feed roller; a gear carried by said base; and a gear connecting said feed roller with said gear on said base.

8. The combination with a base having a central bearing post and a peripheral way, of a casing mounted to revolve on said post and way; a driving spring for said casing connected thereto and to said base; a lens box; delivery and receiving film rollers; and driving means for the receiving film roller.

9. The combination with a base having a central bearing post and a peripheral way, of a casing mounted to revolve on said post and way; a driving spring for said casing connected thereto and to said base; and a lens box.

10. The combination with a base, of a casing mounted to revolve on said base; a driving spring for said casing connected thereto and to said base; a lens box; delivery and receiving film rollers; driving means for the receiving film roller; a feed roller mounted on said casing; a pressure roller adapted to coact with said feed roller; a gear carried by said base; a gear connecting said feed roller with said gear on said base; adjustable bearings for said pressure roller; means for shifting said bearings; and a locking dog for said film roller driving means arranged to be actuated by said pressure roller shifting means.

11. The combination with a base, of a casing mounted to revolve on said base; a driving spring for said casing connected thereto and to said base; a lens box; delivery and receiving film rollers; driving means for the receiving film roller; a feed roller mounted on said casing; a pressure roller adapted to coact with said feed roller; a gear carried by said base; and a gear connecting said feed roller with said gear on said base.

12. The combination with a base, of a casing revolubly mounted thereon; a driving spring for said casing connected thereto and to said base; a lens box; a film; delivery and receiving film rollers; driving means for the receiving film roller; a feed roller mounted on said casing; a pressure roller adapted to coact with said feed roller; a gear carried by said base; a gear connecting said feed roller with said gear on said base; adjustable bearings for said pressure roller carried by said lens box; a rock shaft having cams thereon arranged to hold said pressure roller in its operative position; and a cam on said rock shaft arranged to hold said gear locking dog in its operative position when the said pressure roller is out of operative position.

13. The combination with a base, of a casing revolubly mounted thereon; a driving spring for said casing connected thereto and to said base; a lens box; a film; a feed roller mounted on said casing; a pressure roller adapted to coact with said feed roller; a gear carried by said base; a gear connecting said feed roller with said gear on said base; and adjustable bearings for said pressure roller carried by said lens box.

14. The combination with a base, of a casing revolubly mounted thereon; a driving spring for said casing connected thereto and to said base; a lens box; a film; a feed roller mounted on said casing; a pressure roller adapted to coact with said feed roller; a gear carried by said base; and a gear connecting said feed roller with said gear on said base.

15. The combination with a base, of a casing revolubly mounted on said base; a driving spring for said casing connected thereto and to said base; a lens box; delivery and receiving film rollers; driving means for the receiving film roller comprising a driving gear; a driving spring therefor; a locking dog for said driving gear; gear connections for said driving gear to said receiving film roller; a feed roller; a pressure roller adapted to coact with said feed roller; a gear carried by said base; a gear connecting said feed roller with said gear on said base; adjustable bearings for said pressure roller; a rock shaft having cams thereon arranged to hold said pressure roller in its operative position; and a cam on said rock shaft arranged to hold said gear locking dog in its operative position when the pressure roller is out of operative position.

16. The combination with a revolubly mounted casing; a removable cover for said casing; a lens box having its front or lens plate arranged to project at each side of its side walls and having a vertical slit-like opening in its rear end; vertical supports secured to the wall of said casing and adapted to secure the said end plate; flanges on the bottom of said casing and on said cover adapted to overlap said end plate; delivery and receiving film roller supports arranged on said lens plate at each side of said lens box; guide rollers mounted on the rear end of said lens box adapted to guide the film across the said lens box opening; a film retaining plate arranged on said lens box at the rear of said lens box opening; and driving means for the receiving film roller.

17. The combination with a revolubly mounted casing, of a removable cover for said casing; a lens box having its front or lens plate arranged to project at each side of its side walls and having a vertical slit-like opening in its rear end; vertical supports secured to the wall of said casing and adapted to secure the said end plate; flanges on the bottom of said casing and on said cover adapted to overlap said end plate; delivery and receiving film roller supports arranged on said lens plate at each side of said lens box; guide rollers mounted on the rear end of said lens box adapted to guide the film across the said lens box opening; and driving means for the receiving film roller.

18. The combination with a revolubly mounted casing, of a lens box having its front or lens plate arranged to project at each side of its side walls and having a vertical slit-like opening in its rear end; vertical supports secured to the wall of said casing and adapted to secure the said end plate; delivery and receiving film roller supports arranged on said lens plate at each side of said lens box; guide rollers mounted on the rear end of said lens box adapted to guide the film across the said lens box opening; a film retaining plate arranged on said lens box at the rear of said lens box opening; and driving means for the film roller.

19. The combination with a revolubly mounted casing, of a lens box having its front or lens plate arranged to project at each side of its side walls and having a vertical slit-like opening in its rear end; vertical supports secured to the wall of said casing and adapted to secure the said end plate; delivery and receiving film roller supports arranged on said lens plate at each side of said lens box; guide rollers mounted on the rear end of said lens box adapter to guide the film across the said lens box opening; and driving means for the receiving film roller.

20. The combination with a revolubly mounted casing, of a lens box having its front or lens plate arranged to project at each side of its side walls and having a vertical slit-like opening in its rear end; delivery and receiving film roller supports arranged on said lens plate at each side of said lens box; guide rollers mounted on the rear end of said lens box adapted to guide the film across the said lens box opening; a film retaining plate arranged on said lens box at the rear of said lens box opening; and driving means for the receiving film roller.

21. The combination with a revolubly mounted casing, of a lens box having its front or lens plate arranged to project at each side of its side walls and having a vertical slit-like opening in its rear end; delivery and receiving film roller supports arranged on said lens plate at each side of said lens box; guide rollers mounted on the rear end of said lens box adapted to guide the film across the said lens box opening; and driving means for the receiving film roller.

22. The combination with a revolubly mounted casing, of a lens box; delivery and receiving film rollers; driving means for the said receiving film roller; a locking dog for said driving means; a feed roller carried by said casing; a pressure roller adapted to coact with said feed roller; means for driving said feed roller as said casing is revolved; adjustable bearings for said pressure roller; means for shifting said bearings; and a locking dog for said film roller driving means arranged to be actuated by said pressure roller shifting means.

23. The combination with a revolubly mounted casing, of a lens box; a feed roller carried by said casing; and means for driving said feed roller as said casing is revolved.

24. The combination with a base, of a casing revolubly mounted thereon, said casing having a shutter opening therein; a driving spring for said casing connected thereto and to said base; a shutter; a shutter opening spring; a shutter actuating lever pivoted on said casing; and an adjustable stop for said lever arranged on said base to engage said lever to limit the movement of said casing and close said shutter.

25. The combination with a base, of a casing revolubly mounted thereon, said casing having a shutter opening therein; a driving spring for said casing connected thereto and to said base; a shutter; a shutter opening spring; a shutter actuating lever pivoted on said casing; and a stop for said lever arranged on said base to engage said lever to limit the movement of said casing and close said shutter.

26. The combination with a base, of a casing revolubly mounted thereon, said casing having a shutter opening therein; a driving spring for said casing connected thereto and to said base; a shutter; a shutter actuating lever pivoted on said casing; and an adjustable stop for said lever arranged on said base to engage said lever to limit the movement of said casing and close said shutter.

27. The combination with a base, of a casing revolubly mounted thereon, said casing having a shutter opening therein; a driving spring for said casing connected thereto and to said base; a shutter; a shutter actuating lever pivoted on said casing; and a stop for said lever arranged on said base to engage said lever to limit the movement of said casing and close said shutter.

28. The combination with a revolubly mounted casing, said casing having a shutter opening therein connected thereto and to said base; a shutter; a shutter actuating lever pivoted on said casing; and an adjustable stop for said lever arranged to engage said lever to limit the movement of said casing and close said shutter.

29. The combination with a revolubly mounted casing, said casing having a shutter opening therein connected thereto and to said base; a shutter; a shutter actuated lever pivoted on said casing; and a stop for said lever arranged to engage said lever to limit the movement of said casing and close said shutter.

30. The combination with a case, of a revolubly mounted casing, said casing having a shutter opening therein; a shutter; a shutter opening spring; a shutter actuating lever pivoted on said casing; and a trip for said lever arranged on said base to engage said lever and close said shutter.

31. The combination with a base, of a revolubly mounted casing, said casing having a shutter opening therein; a shutter; a shutter actuating lever pivoted on said casing; and a trip for said lever arranged on said base to engage said lever and close said shutter.

32. A structure of the class described comprising an engine cylinder; a plunger in said cylinder; and air supply means, said cylinder having an exhaust port whereby the outstroke of the said plunger is limited and its return permitted without the withdrawal of air through the air supply means.

33. The combination of a revolubly mounted casing; a lens box having triangular side walls arranged to form a casing hexagonal in cross section, said casing being flared vertically and tapered horizontally toward the rear and having a slit-like opening in its rear walls; and a suitable lens.

34. The combination of a revolubly mounted casing; a lens box having its walls arranged to form a casing flared vertically and tapered horizontally toward the rear and having a slit-like opening in its rear wall; and a suitable lens.

35. The combination with a base, of a revolubly mounted casing having a shutter opening therein; a shutter; a shutter actuating means carried by said casing; a trip for said shutter actuating means arranged on said base to engage said shutter actuating means and close said shutter.

In witness whereof, I have hereunto set my hand and seal in the presence of two witnesses.

IRA O. PERRING. [L. S.]

Witnesses:
  CLORA E. BRADEN,
  JESSIE MCILVAINE.